United States Patent [19]

Saitou

[11] Patent Number: 4,488,197
[45] Date of Patent: Dec. 11, 1984

[54] PLATE ROCKING-COUPLING APPARATUS
[75] Inventor: Sinichi Saitou, Tokyo, Japan
[73] Assignee: Olympus Optical Co., Ltd., Tokyo, Japan
[21] Appl. No.: 381,960
[22] Filed: May 25, 1982
[30] Foreign Application Priority Data May 28, 1981 [JP] Japan ............................... 56-77873[U]

[51] Int. Cl.³ ............................................... G11B 0/00
[52] U.S. Cl. .................................................... 360/137
[58] Field of Search ........................... 360/137, 90–94, 360/96.1–96.6, 73

[56] References Cited
U.S. PATENT DOCUMENTS 4,450,491 5/1984 Takagi et al. .................. 360/137 X Primary Examiner—John H. Wolff
Attorney, Agent, or Firm—Frishauf, Holtz, Goodman and Woodward

[57] ABSTRACT

A plate rocking-coupling apparatus comprises a first plate member having in the peripheral surface of the first plate member an indentation with an opening, the length of the opening along the longitudinal direction of the peripheral surface being shorter than the length of the indentation along the longitudinal direction at a position off the opening, and a second plate member having a projected portion protruding from the peripheral surface of the second plate member and fitted in the opening so as to be in slide contact with the peripheral surface of the indentation along the circumferential direction of the peripheral surface.

8 Claims, 10 Drawing Figures

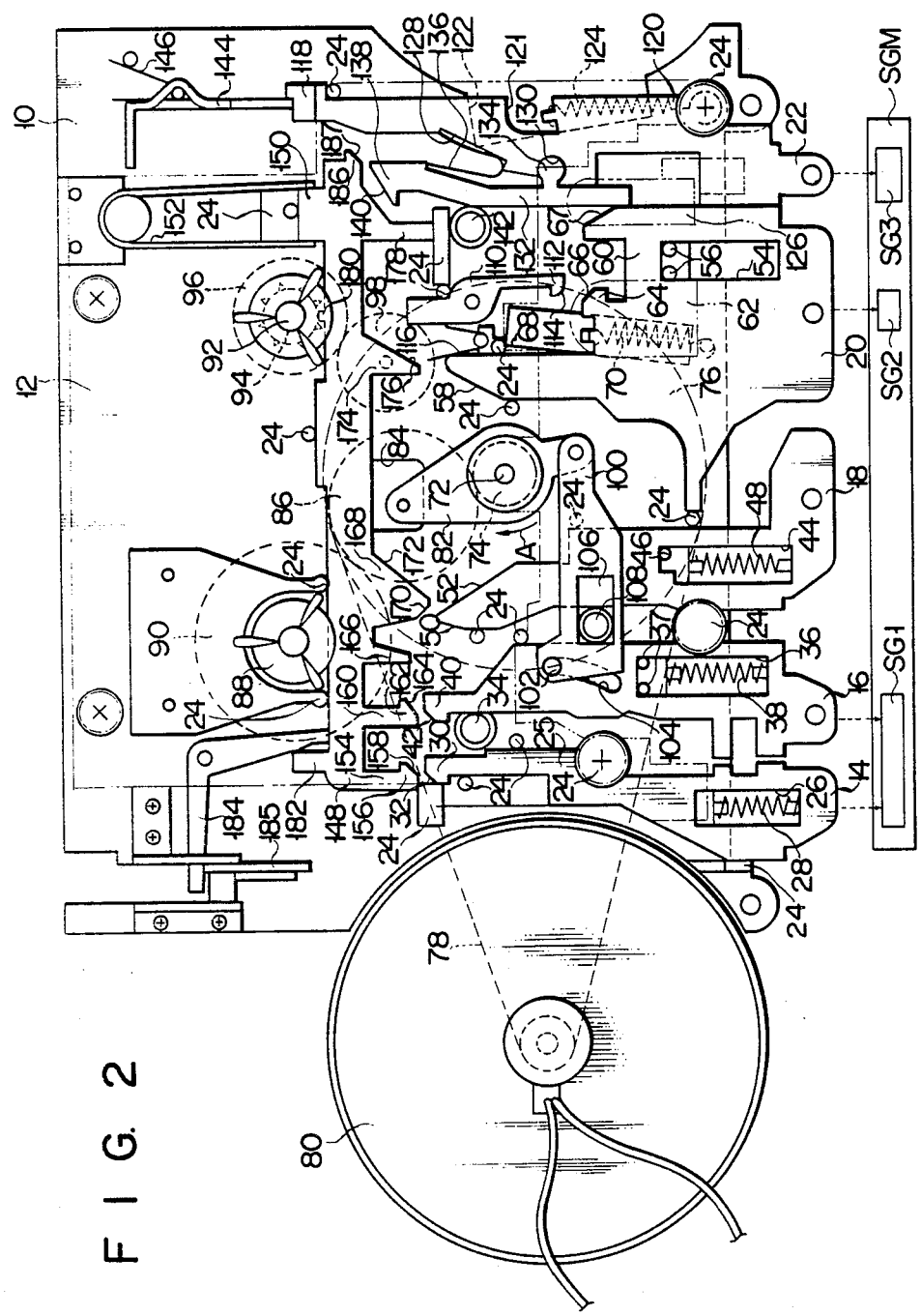
F I G. 2

PLATE ROCKING-COUPLING APPARATUS

BACKGROUND OF THE INVENTION

This invention relates to a plate rocking-coupling apparatus for coupling a pair of plates and rocking one of the plates along the plane of the other.

Conventionally, in manufacturing a plate rocking-coupling apparatus, a pair of plates are put flat on top of each other, then a piercing hole is bored through the overlapping regions of these plates, and a shaft is passed through the hole. In the prior art plate rocking-coupling device of such construction, the manufacture work for the formation of the piercing hole and shaft, as well as the assembly work including the insertion of the shaft into the hole, is troublesome. Moreover, the thickness of the apparatus will be increased due to the overlap of the two plates, which will constitute a hindrance to the miniaturization of products using such apparatus. Such a situation is quite awkward in the case where compact design is one of the important selling points of those products. The products mentioned here include, for example, tape recorders employing the so-called micro cassettes.

SUMMARY OF THE INVENTION

This invention is contrived in consideration of these circumstances, and is intended to provide a plate rocking-coupling apparatus in which the thickness of the product using such apparatus is reduced and simplified in construction for easier manufacture and assembly.

The above object of the invention may be attained by a plate rocking-coupling apparatus which comprises a first plate member having in the peripheral surface of the first plate member an indentation with an opening, the length of the opening along the longitudinal direction of the peripheral surface being shorter than the length of the indentation along the longitudinal direction at a position off the opening, and a second plate member having a projected portion protruding from the peripheral surface of the second plate member and fitted in the opening so as to be in slide contact with the peripheral surface of the indentation along the circumferential direction of the peripheral surface.

Preferably, in the plate rocking-coupling apparatus of the invention, the respective plane configurations of the indentation and the projected portion in slide contact with the peripheral surface of the indentation are circular.

With such construction, the plate rocking-coupling apparatus can be simplified to facilitate the manufacture and assembly thereof.

BRIEF DESCRIPTION OF THE DRAWINGS

FIG. 2 is a plan view showing a state in which a plurality of operating levers of the operating lever apparatus of the tape recorder including the embodiment of the invention are located in their respective first position;

FIG. 10 is a plan view showing a state in which the pair of reel hubs of the tape cassette are mounted on the pair of reel shafts of the tape recorder of FIG. 2, and in which the first operating lever to function as the fast-forward lever and the fifth operating lever to function as the recording lever and constitute the first plate member of the invention are located in their respective second positions, and the rocking lever to constitute the second plate member of the invention is turned around its projected portion to establish a quick erasing mode in the tape recorder.

Now an embodiment of this invention will be described in detail with reference to the accompanying drawings.

DETAILED DESCRIPTION OF THE PREFERRED EMBODIMENT

Figure 1:
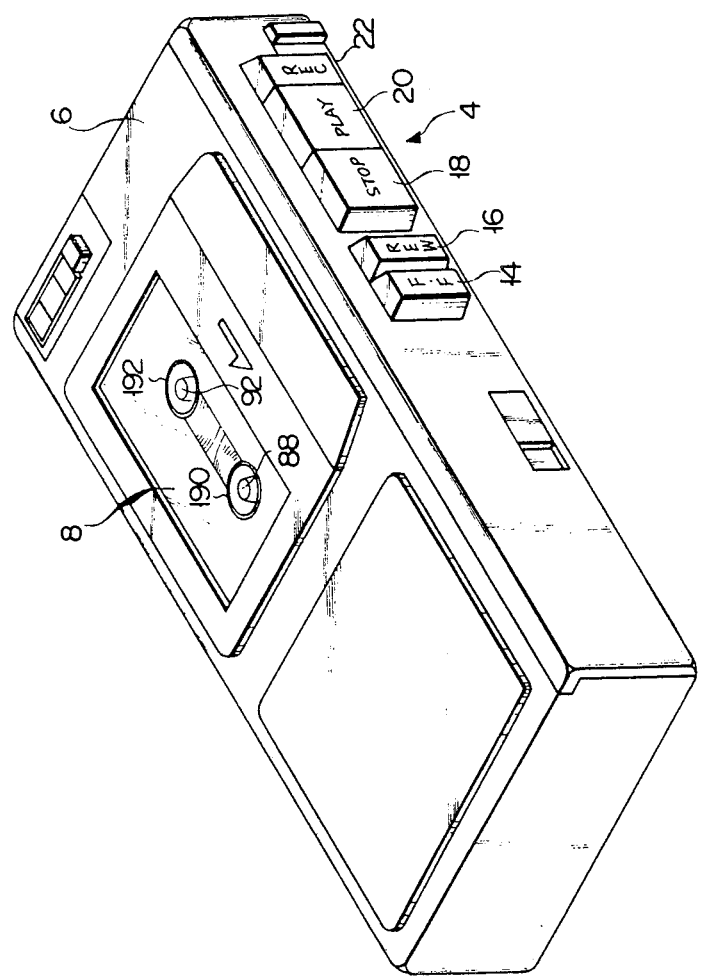
FIG. 1 is a perspective view of a tape recorder which is provided with an operating lever apparatus including a plate rocking-coupling apparatus according to an embodiment of this invention.

FIG. 1 shows an electric appliance 6 which is provided with an operating lever apparatus 4 including a plate rocking-coupling apparatus according to an embodiment of this invention. In this embodiment, the electric appliance 6 is a tape recorder using what is called a micro cassette 8, one of the selling points of which lies in compact design or miniaturization.

The operating lever apparatus 4 is provided with a flat first base plate 10 inside the housing of the electric appliance 6, as shown in FIG. 2.

In front of the first base plate 10, as shown in FIG. 2, a flat second base plate 12 is disposed parallel thereto at a given space therefrom.

Arranged between the first and second base plates 10 and 12 are first to fifth operating levers 14, 16, 18, 20 and 22 formed of flat metal plates.

As shown in FIG. 2, the first to fifth operating levers 14, 16, 18, 20 and 22 are vertically elongated and substantially parallel to one another. The respective lower ends of the first to fifth operating levers 14, 16, 18, 20 and 22 project from the lower edges of the first and second base plates 10 and 12 into the outside space.

A plurality of guide projections 24 are formed on the front surface of the first base plate 10.

As shown in FIG. 2, some of the guide projections 24 are in contact with the vertically extending edges of the first to fifth operating levers 14, 16, 18, 20 and 22. Having their vertical edges in slide contact with the guide projections 24, the first to fifth operating levers 14, 16, 18, 20 and 22 are allowed to move only in the vertical direction. A rightwardly projected portion 25 is formed on the right-hand side face of the first operating lever 14, and the lower end face of the projected portion 25 is in contact with one of the guide projections 24 in the state shown in FIG. 2. The position of the first operating lever 14 in this state is defined as its first position.

As shown in FIG. 2, a vertically extending slot 26 is formed in the first operating lever 14. An urging means 24 is fitted in the slot 26. In this embodiment, the urging means 28 is formed of a compression coil spring, the upper end of which abuts on the lower end face of the first base plate 10, and the lower end of which abuts on the lower end face of the slot 26 of the first operating lever 14. The urging means 28 urges the first operating lever 14 to be located in its first position. The diameter of the urging means 28 is only a little greater than the sum of the thicknesses of the first and second base plates 10, 12 and the thickness of the first operating lever 14. Therefore, the urging means 28 projects only slightly from the back surface of the first base plate 10 into the outside space.

As shown in FIG. 2, a leftwardly projected first engaging portion 30 is formed at the upper end portion of the first operating lever 14. The intersectional region between the upper end face and left-hand side face of the first engaging portion 30 is chamfered to form a first slant face 32.

Between the right-hand side face of the upper end portion of the first operating lever 14 and the lefthand side face of the upper end portion of the second operating lever 16, as shown in FIG. 2, a first cassette positioning pin 34 is fixed on the front surface of the first base plate 10. The front end of the first cassette positioning pin 34 penetrates the second base plate 12 to be located ahead thereof.

As shown in FIG. 2, a vertically extending slot 36 is formed in the second operating lever 16. Stoppers 37 fixed on the front surface of the first base plate 10 are in contact with the upper end face of the slot 36. The position of the second operating lever 16 in this state is defined as its first positon. An urging means 38 is fitted in the slot 36. In this embodiment, the urging means 38 is formed of a compression coil spring, the upper end of which abuts on the lower end face of the first base plate 10, and the lower end of which abuts on the lower end face of the slot 36 of the second operating lever 16. The urging means 38 urges the second operating lever 16 to be located in its first position. The diameter of the urging means 38 is only a little greater than the sum of the thicknesses of the first and second base plates 10, 12 and the thickness of the second operating lever 16. Therefore, the urging means 38 projects only slightly from the back surface of the first base plate 10 into the outside space.

As shown in FIG. 2, a leftwardly projected second engaging portion 40 is formed at the upper end portion of the second operating lever 16. The intersectional region between the upper end face and left-hand side face of the second engaging portion 40 is chamfered to form a second slant face 42.

As shown in FIG. 2, a vertically extending slot 44 is formed in the third operating lever 18. A stopper 46 fixed on the front surface of the first base plate 10 is in contact with the upper end face of the slot 44. The position of the third operating lever 18 in this state is defined as its first position.

An urging means 48 is fitted in the slot 44. In this embodiment, the urging means 48 is formed of a compression coil spring, the upper end of which abuts on the lower end face of the first base plate 10, and the lower end of which abuts on the lower end face of the slot 44 of the third operating lever 18. The urging means 48 urges the third operating lever 18 to be located in its first position. The diameter of the urging means 48 is only a little greater than the sum of the thicknesses of the first and second base plates 10, 12 and the thickness of the third operating lever 18. Therefore, the urging means 48 projects only slightly from the back surface of the first base plate 10 into the outside space.

The intersectional regions between the upper end face and the left- and right-hand side faces of the third operating lever 18 are chamfered to form two third slant faces 50 and 52.

As shown in FIG. 2, a vertically extending slot 54 is formed in the fourth operating lever 20. Stoppers 56 fixed on the front surface of the first base plate 10 are in contact with the upper end face of the slot 54. The position of the fourth operating lever 20 in this state is defined as its first position.

The intersectional region between the upper end face and left-hand side face of the fourth operating lever 20 is chamfered to form a fourth slant face 58, as shown in FIG. 2. A rightwardly projected support portion 60 is formed on the right-hand side face of the fourth operating lever 20. In front of the support portion 60, a magnetic head 62 is disposed ahead of the front surface of the second base plate 12. The magnetic head 62 is fixed on the support portion 60 by means of a leg (not shown) passed through a hole (not shown) formed in the second base plate 12. An indentation is formed in the upper end face of the support portion 60, and a fourth engaging portion 64 projects to the right in the indentation. The intersectional region between the upper end face and right-hand side face of the fourth engaging portion 64 is chamfered to form another fourth slant face 66, as shown in FIG. 2. Further, the intersectional region between the upper end face and right-hand side face of the support portion 60 is chamfered to form a chamfer portion 67.

Formed in the first base plate 10 is a vertically extending slot 68 which crosses the upper end face of the support portion 60 of the fourth operating lever 20. In this embodiment, the slot 68 has a slight tilt to the right. An urging means 70 is disposed in the slot 68. In this embodiment, the urging means 70 is formed of a tension coil spring, one end of which is moored to a projection formed on the upper end face of the support portion 60 of the fourth operating lever 20, and the other end of which is fixed to the back surface of the first base plate 10 in the vicinity of the lower end face of the slot 68. The urging means 70 urges the fourth operating lever 20 to be located in its first position. In such an arrangement, the urging means 70 presses the fourth operating lever 20 against the front surface of the first base plate 10; the left-hand side face of the fourth operating lever 20 against one of the guide projections 24, and the right-hand side face of the slot 54 against one of the stoppers 56.

Between the respective upper end portions of the third and fourth operating levers 18 and 20, a capstan 72 is rotatably mounted on the first base plate 10. The front end of the capstan 72 penetrates the second base plate 12 to be located ahead thereof. As shown in FIG. 2, a first gear 74 and a flywheel 76 are concentrically fixed to the rear end of the capstan 72 at the back of the first base plate 10. A driving belt 78 is wound round the peripheral surface of the flywheel 76 and the output shaft of an electric motor 80 which is fixed on the first base plate 10, as shown in FIG. 2.

A first rotating lever 82 is mounted on the front surface of the first base plate 10 so as to be able to rotate coaxially with the capstan 72. The first rotating lever 82 extends vertically, and can rotate between the first and second base plates 10 and 12. A backwardly projected shaft is fixed to the back surface of the upper end portion of the first rotating lever 82. This shaft is passed through a hole 84 in the first base plate 10, and a second gear 86 is rotatably attached to the rear end of the shaft at the back of the first base plate 10. The second gear 86 is in mesh with the first gear 74.

Over the upper end face of the third operating lever 16, a first reel shaft 88 is rotatably mounted on the first base plate 10. The front end of the first reel shaft 88 penetrates the second base plate 12 to be located ahead of the front surface of the second base plate 12. A third gear 90 is concentrically fixed to the rear end of the first reel shaft 88 at the back of the first base plate 10. The third gear 90 is in mesh with the second gear 86. The position of the first rotating lever 82 in this state is defined as its first position.

Over the upper end face of the fourth operating lever 18, a second reel shaft 92 is rotatably mounted on the first base plate 10. The front end of the second reel shaft 92 penetrates the second base plate 12 to be located ahead of the front surface of the second base plate 12. Fixed to the second reel shaft 92 is a projected member 94 having a plurality of projections which project outwardly in the radial direction of the second reel shaft 92. The projections on the projected member 94 rotate together with the second reel shaft 92 between the first and second base plates 10 and 12. A fourth gear 96 is concentrically fixed to the rear end of the second reel shaft 92 at the back of the first base plate 10. A fifth gear 98 is rotatably attached to the back surface of the first base plate 10. The fifth gear 98 is located within the locus of movement of the second gear 86 described as the first rotating lever 82 rotates clockwise from its first position as shown in FIG. 2, and is in mesh with the fourth gear 96.

In this embodiment, as shown in FIG. 2, the second base plate 12 is notched at the region located below the capstan 72 and facing the second to fourth operating levers 16, 18 and 20. Accordingly, the lower end portion of the first rotating lever 82 is not opposite to the second base plate 12.

The right-hand end portion of a horizontally extending flat coupling member 100 is rotatably mounted on the front surface of the lower end portion of the first rotating lever 82. The left-hand end portion of the coupling member 100 lies on the front surface of the second operating lever 16.

The thickness of the coupling member 100 is equal to that of the second base plate 12. Thus, the coupling member 100 is located within a space between the respective front faces of the first rotating lever 82 and the second operating lever 16, which face the second base plate 12, and the front surface of the second base plate 12, which is to bear the tape cassette 8 set in the tape recorder as the electric appliance 6. Accordingly, the coupling member 100 does not project ahead of the front surface of the second base plate 12.

A backwardly projected guide pin 102 is fixed to the back surface of the left-hand end portion of the coupling member 100. The guide pin 102 is fitted in a guide hole 104 in the second operating lever 16. The guide hole 104 extends straight in the vertical direction and has a tilt to the right. The guide pin 102 of the coupling member 100 is positioned at the upper end of the guide hole 104.

A horizontally extending slot 106 is formed in the coupling member 100. Passed through the left end portion of the slot 106 is a shaft 108 which protrudes forwardly from the first base plate 10 between the right-hand side face of the second operating lever 16 and the left-hand side face of the third operating lever 18. The outer peripheral surface of the shaft 108 is in contact with the horizontally extending upper and lower end face portions of the inner peripheral surface of the coupling member 100 which define the slot 106.

A vertically extending second rotating lever 110 lies between the support portion 60 of the fourth operating lever 20 and the second reel shaft 92, as well as between the first and second base plate 12. The second rotating lever 110 is pivotally mounted substantially at the middle on the front surface of the first base plate 10, and can rotate along the front surface of the first base plate 10. A leftwardly extending engaging projection 112 is formed at the lower end portion of the left-hand side face of the second rotating lever 110. The intersectional region between the left-hand side face and lower end face of the engaging portion 112 is chamfered to form a slide contact surface 114, which vertically faces the fourth slant face 66 of the fourth engaging portion 64 of the fourth operating lever 20. The position of the second rotating lever 110 in this state is defined as its first position. One of the guide projections 24 is in contact with the side face of the second rotating lever 110 so that the second rotating lever 110 is allowed to rotate only in the counterclockwise direction from its first position as shown in FIG. 2. The second rotating lever 110 is urged to be located in the first position by an urging means 116 which is disposed between the first and second base plates 10 and 12. In this embodiment, the urging means 116 is formed of a leaf spring, whose dimension along the thickness of the operating lever apparatus can be smaller than that of a compression coil spring.

The fifth operating lever 22 constitutes a first plate member of this invention. A rightwardly projected portion 118 is formed at the upper end portion of the right-hand side face of the fifth operating lever 22, and one of the guide projections 24 is in contact with the lower end face of the projected portion 118. Also, a rightwardly projected portion 120 is formed at the lower end portion of the right-hand side face of the fifth operating lever 22, and one of the guide projections 24 is in contact with the lower end face of the projection portion 120. The position of the fifth operating lever 22 in this position is defined as its first position.

An indentation 121 is formed in the right-hand side face of the fifth operating lever 22, lying substantially halfway between the upper and lower ends thereof. Formed in the first base plate 10 is a vertically extending slot 122 which crosses the indentation 121 of the fifth operating lever 22. In this embodiment, the slot 122 has a slight tilt to the left. An urging means 124 is disposed in the slot 122. In this embodiment, the urging means 124 is formed of a tension coil spring, one end of which is moored to a projection formed on the lower end face portion of the inner peripheral surface of the fifth operating lever 22 which defines the indentation 121, and the other end of which is fixed to the back surface of the first base plate 10 in the vicinity of the lower end face of the slot 122. The urging means 124 urges the fifth operating lever 22 to be located in its first position. In such an arrangement, the urging means 124 presses the fifth operating lever 22 against the front surface of the first base plate 10, and right-hand side face of the fifth operating lever 22 against the guide projection 24.

In front of the fifth operating lever 22, an erasing head 126 is disposed ahead of the front surface of the second base plate 12. The erasing head 126 is fixed on the front surface of the fifth operating lever 22 by means of a leg (not shown) passed through a hole (not shown) formed in the second base plate 12.

Formed on the left-hand side face of the fifth operating lever 22 is a slant face 128 which has a tilt to the right from a position above the upper end face of the support portion 60 of the fourth operating lever 20. A circular indentation 130 is formed at the lower end portion of the slant face 128, part of the indentation 130 opening in the slant face 128. Thus, the length of the opening of the indentation 130 along the longitudinal direction of the slant face 128 is shorter than the diameter of the indentation 130, that is, the length of the indentation 130 along the longitudinal direction of the slant face 128 at a position off the opening of the indentation 130.

A vertically extending rocking lever 132 lies between the left-hand side face of the fifth operating 22 and the right-hand side face of the fourth operating lever 20, as well as between the first and second base plates 10 and 12. The rocking lever 132 constitutes a second plate member of this invention.

The lower end portion of the right-hand side face of the rocking lever 132 is in contact with the left-hand side face of the fifth operating lever 22 near the region directly under the position where the left-hand side face and the slant face 128 of the fifth operating lever 22 intersect each other. The position of the rocking lever 132 in this state is defined as its first position. The lower end portion of the left-hand side face of the rocking lever 132 is in contact with the right-hand side face of the support portion 60 of the fourth operating lever 20 near the region directly under the position where the right-hand side face and the chamfer portion 67 of the support portion 60 intersect each other. Formed on the right-hand side face of the rocking lever 132 is a rightwardly projected portion 134 which is fitted in the opening of the indentation 130 of the fifth operating lever 22. The projected portion 134 has a circular outer peripheral surface, which is in contact with the inner peripheral surface of the fifth operating lever 22 defining the indentation 130.

As shown in FIG. 2, the region of the right-hand side face of the rocking lever 132 above the projected portion 134 and the slant face 128 of the fifth operating lever 22 face each other with a space between them, in which an urging means 136 to react against compression is disposed. In this embodiment, the urging means 136 is formed of a leaf spring, whose dimension along the thickness of the operating lever apparatus 4 is smaller than that of a compression coil spring.

A leftwardly projected fifth engaging portion 138 is formed at the upper end portion of the left-hand side face of the rocking lever 132. The intersectional region between the left-hand side face and upper end face of the fifth engaging portion 138 is chamfered to form a fifth slant face 140.

Between the second rotating lever 110 and the rocking lever 132, as shown in FIG. 2, a second cassette positioning pin 142 is fixed on the front surface of the first base plate 10. The front end of the second cassette positioning pin 142 penetrates the second base plate 12 to be located ahead thereof.

An accidental erasure preventive lever 144 is disposed over the upper end face of the fifth operating lever 22. The accidental erasure preventive lever 144 extends vertically and is pivotally mounted substantially at the middle on the front surface of the first base plate 10. Thus, the accidental erasure preventive lever 144 can rotate along the front surface of the first base plate 10. The lower end face of the accidental erasure preventive lever 144 is in contact with the upper end face of the fifth operating lever 22. Further, the lower end portion of the right-hand side face of the accidental erasure preventive lever 144 is in contact with the left-hand side face of a projection which protrudes upward from the upper end face of the fifth operating lever 22. The position of the accidental erasure preventive lever 144 in this state is defined as its first positon. The accidental erasure preventive lever 144 is urged by an urging means 146 to be located in its first position. The upper end portion of the accidental erasure preventive lever 144 is bent to the left to form a detecting section for detecting an accidental erasure preventive lug of the tape cassette 8.

Between the first and second base plates 10 and 12, as shown in FIG. 2, a flat auxiliary operating lever 148 lies over the respective upper end faces of the first to fourth operating levers 14, 16, 18 and 20 and the rocking lever 132. The auxiliary operating lever 148 has an elongate shape extending horizontally.

As shown in FIG. 2, some of the guide projections 24 are in contact with the horizontally extending upper and lower end faces of the auxiliary operating lever 148. Having its upper and lower end faces in slide contact with the guide projections 24, the auxiliary operating lever 148 is allowed to move only in the horizontal direction.

As shown in FIG. 2, an upwardly projected portion 150 is formed on the upper end face of the auxiliary operating lever 148.

The vertically extending left- and right-hand side faces of the upwardly projected portion 150, as shown in FIG. 2, are subjected to opposite urging forces applied by an urging means 152 which is disposed between the first and second base plates 10 and 12. The auxiliary operating lever 148 ceases to move horizontally at the position where the two urging forces of the urging means 152 are balanced with each other. This position of the auxiliary operating lever 148 is defined as its first position. In this embodiment, the urging means 152 is formed of a U-shaped leaf spring, having a pair of leg portions severally in contact with the left- and right-hand side faces of the upwardly projected portion 150 of the auxiliary operating lever 148. The urging force of the urging means 152 is greater than the urging force of the urging means 136 of the rocking lever 132. The dimension of the leaf spring along the thickness of the operating lever apparatus can be made smaller than that of a coil spring.

As shown in FIG. 2, a downwardly projected first hanging portion 154 is formed at the left-hand end portion of the auxiliary operating lever 148. A rightwardly projected first engaged portion 156 is formed at the lower end portion of the first hanging portion 154. The intersectional region between the lower end face and right-hand side face of the first engaged portion 156, as shown in FIG. 2, is chamfered to form a first auxiliary slant face 158. The first auxiliary slant face 158 vertically faces the first slant face 32 of the first operating lever 14.

Formed on the lower end face of the auxiliary operating lever 148 is a second hanging portion 160 which protrudes downward from the position to face the upper end face of the second operating lever 16. The left-hand side face of the second hanging portion 160 is separated from the right-hand side face of the first engaged portion 156 of the first hanging portion 154, as shown in FIG. 2. The distance between the left-hand side face of the second hanging portion 160 and the right-hand side face of the first engaged portion 156 is greater than the distance between the right-hand side face of the upper end portion of the first operating lever 14 and the left-hand side face of the first engaging portion 30. As shown in FIG. 2, a rightwardly extending second engaged portion 162 is formed on the right-hand side face of the second engaging portion 160. The intersectional region between the right-hand side face and lower end face of the second engaged portion 162 is chamfered to form a second auxiliary slant face 164. The second auxiliary slant face 164 vertically faces the second slant face 42 of the second operating lever 16.

Between the right-hand side face of the upper end portion of the second operating lever 16 and the left-hand side face of the upper end portion of the third operating lever 18, a downwardly projected stopper 166 is formed on the lower end face of the auxiliary operating lever 148. The left-hand side face of the stopper 166 is separated from the right-hand side face of the second engaged portion 162 of the second hanging portion 160, as shown in FIG. 2. The distance between the left-hand side face of the stopper 166 and the right-hand side face of the second engaged portion 162 of the second hanging portion 160 is greater than the distance between the right-hand side face of the upper end portion of the second operating lever 16 and the left-hand side face of the second engaging portion 40.

Formed on the lower end face of the auxiliary operating lever 148 is a third hanging portion 168 which protrudes downward from the position to face the upper end face of the third operating lever 18. The intersectional region between the left-hand side face and lower end face of the third hanging portion 168 is chamfered to form a third auxiliary slant face 170. The third auxiliary slant face 170 vertically faces the third slant face 52 of the third operating lever 18.

As shown in FIG. 2, the right-hand side face of the third hanging portion 168 has a tilt to the upper right to form a third auxiliary slant face 172.

Formed on the lower end face of the auxiliary operating lever 148 is a fourth hanging portion 174 which protrudes downward from the position to face the upper end face of the fourth operating lever 18. As shown in FIG. 2, the right-hand side face of the fourth hanging portion 174 has a tilt to the upper right to form a fourth auxiliary slant face 176.

Between the respective upper end portions of the second rotating lever 110 and the rocking lever 132, a downwardly projected first hook member 178 is formed on the lower end face of the auxiliary operating lever 148. As shown in FIG. 2, the left-hand side face of the first hook member 178 faces the right-hand side face of the upper end portion of the second rotating lever 110 with a given horizontal space between them.

An upwardly projected engaging member 180 is formed on the upper end face of the auxiliary operating lever 148. As shown in FIG. 2, the engaging member 180 is located within the locus of rotation of the projections on the projected member 94 of the second reel shaft 92. Accordingly, the engaging member 180 can engage the projections on the projected member 94.

An upwardly projected second hook member 182 is formed on the left-hand end portion of the upper end face of the auxiliary operating lever 148.

Between the first and second base plates 10 and 12, an inverted L-shaped third rotating lever 184 is disposed over the second hook member 182. The third rotating lever 184 is pivotally mounted substantially at the middle on the front surface of the first base plate 10, and can rotate along the front of the first base plate 10. The left-hand side face of the lower end portion of the third rotating lever 184 abuts on the right-hand side face of the second hook member 182. The lower end face of a leftwardly extending portion of the third rotating lever 184 is in contact with that region of an ejecting lever 185 which is off the rocking center thereof, the ejecting lever 185 being mounted on the first base plate 10 so as to be able to rock in the direction to cross the front surface of the first base plate 10. A rightwardly projected fifth engaged portion 186 is formed on the right-hand side face of the auxiliary operating lever 148. The intersectional region between the right-hand side face and lower end face of the fifth engaged portion 186 is chamfered to form a fifth auxiliary slant face 187. The fifth auxiliary slant face 187 vertically faces the fifth slant face 140 of the rocking lever 132.

The first and second operating levers 14 and 16 are coupled with a first signal generator SG1. When one of the first and second operating levers 14 and 16 stops upward movement from its first position against the urging force of the urging means 28 or 38, the first signal generator SG1 produces a first electric signal to rotate the output shaft of the motor 80 in one direction at relatively high speed, thereby rotating the capstan 72 and the first gear 74 in the direction indicated by arrow A in FIG. 2 at relatively high speed.

The fourth operating lever 20 is coupled with a second signal generator SG2. When the fourth operating lever 20 stops upward movement from its first position against the urging force of the urging means 70, the second signal generator SG2 produces a second electric signal to rotate the output shaft of the motor 80 in one direction at relatively low speed, thereby rotating the capstan 72 and the first gear 74 in the direction indicated by arrow A in FIG. 2 at relatively low speed. At the same time, the second signal generator SG2 causes the magnetic head 62 to function as a reproducing head.

The fifth operating lever 22 is coupled with a third signal generator SG3. When the fifth operating lever 22 finishes upward movement from its first position against the urging force of the urging means 124, the third signal generator SG3 causes the magnetic head 62 to function as a recording head. In this embodiment, the first to third signal generators SG1, SG2 and SG3 are of conventional arrangements.

There will now be described the operation of the operating lever apparatus 4 including the plate rocking-coupling apparatus according to the one embodiment of this invention which is constructed in the above-mentioned manner.

Figure 3:
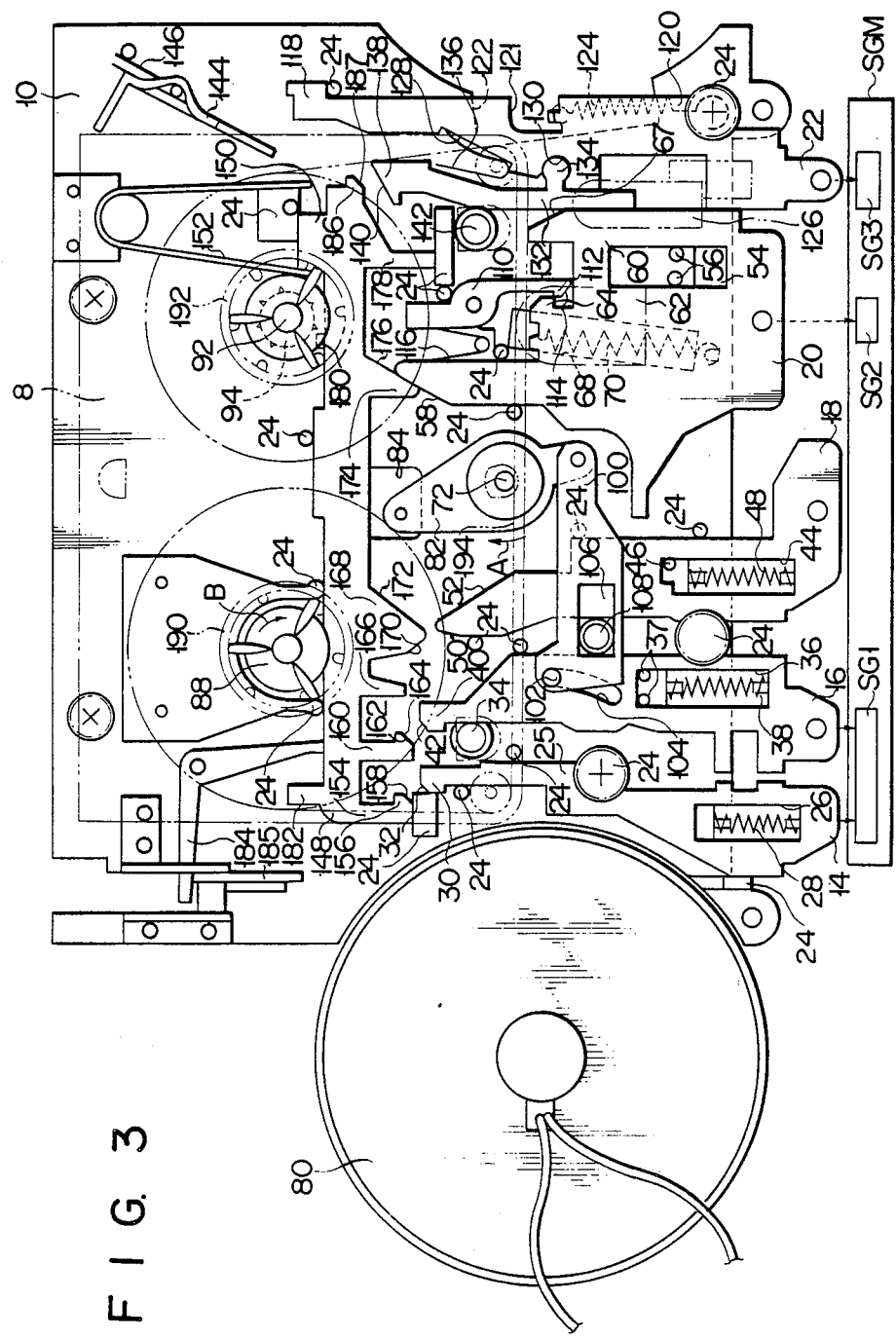
FIG. 3 is a plan view showing a state in which a pair of reel hubs of a tape cassette are mounted on a pair of reel shafts of the tape recorder of FIG. 2, and in which a fourth operating lever to function as a playback lever is located in its second position.

As shown in FIG. 3, the first and second reel shafts 88 and 92 are fitted with first and second reel hubs 190 and 192, respectively, of the tape cassette 8. In this state, the capstan 72 is in contact with the back surface of a magnetic recording tape 194 between the first and second reel hubs 190 and 192. The housing of the tape cassette 8 is put on the front of the second base plate 12. The second base plate 12 is shown in FIG. 2 but not shown in FIGS. 3 to 10 for avoiding the complication of the drawing. After detecting the accidental erasure preventive lug of the tape cassette 8 by means of its detecting section, the accidental erasure preventive lever 144 rotates clockwise against the urging force of the urging means 146 to have its lower end face off the upper end face of the fifth operating lever 22.

When the fourth operating lever 20 is pressed upward, it moves up from its first position against the urging force of the urging means 70. The fourth slant face 58 of the upwardly moving fourth operating lever 20 comes into slide contact with the fourth auxiliary slant face 176 of the auxiliary operating lever 148, causing the auxiliary operating lever 148 to move from its first position to the left against the urging force of the urging means 152. Also, the fourth slant face 66 of the fourth engaging portion 64 of the upwardly moving fourth operating lever 20 comes into slide contact with the slide contact surface 114 of the second rotating lever 110, causing the second rotating lever 110 to rotate counterclockwise from its first position against the urging force of the urging means 116. When the fourth engaging portion 64 engages the engaging portion 112 of the rotating lever 110, as shown in FIG. 3, the fourth operating lever 20 stops moving upwardly. The position of the fourth operating lever 20 in this state is defined as its second position.

The horizontal position of the auxiliary operating lever 148 when the fourth operating lever 20 is located in its second position shown in FIG. 3 is defined as a second position of the auxiliary operating lever 148. In this state, the engaging member 180 of the auxiliary operating lever 148 is off the locus of rotation of the projections on the projected member 94 of the second reel shaft 92, as shown in FIG. 3. Accordingly, the second reel shaft 92 is allowed to rotate freely. When the fourth operating lever 20 is located in its second position, the second signal generator SG2 causes the motor 80 to rotate the capstan 72 in the clockwise direction as indicated by arrow A in FIG. 3 at fixed relatively low speed. The rotation of the capstan 72 is transmitted through the first to third gears 74, 86 and 90 to the first reel shaft 88, which then rotates in the direction indicated by arrow B. When the fourth operating lever 20 is located in its second position, moreover, a pinch roller (not shown) is brought into contact with the front surface of the magnetic recording tape 194. This pinch roller holds the tape 194 in conjunction with the capstan 72. Thus, the tape 194 is wound around the first reel hub 190 after it is drawn out from the side of the second reel hub 192 by the capstan 72 and the pinch roller.

When the fourth operating lever 20 is located in its second position, furthermore, the magnetic head 62 comes into contact with the front surface of the magnetic recording tape 194, as shown in FIG. 3. As described before, the fourth operating lever 20 is pressed against the front surface of the first base plate 10 and the guide projection 24 by the urging force of the urging means 70. Accordingly, the gap of the magnetic head 62 always abuts on the front surface of the tape 194 at a predetermined portion thereof.

When the fourth operating lever 20 is located in its second position, moreover, the second signal generator SG2 causes the magnetic head 62 to function as the reproducing head. In this state, therefore, information previously recorded on the magnetic recording tape 194 is reproduced by the magnetic head 62 as the tape 194 runs from the second reel hub 192 to the first reel hub 190 at the fixed speed. Thus, a playback mode is established in the tape recorder 6 which is provided with the operating lever apparatus 4 including the plate rocking-coupling apparatus according to this embodiment. This means that the fourth operating lever 20 serves as a reproducing or playback lever in the tape recorder 6.

When the auxiliary operating lever 148 is located in its second position, the loci of the upward movement of the right-hand side face of the upper end portion of the first operating lever 14 and the left-hand side face of the first engaging portion 30 are located between the right-hand side face of the first engaging portion 156 of the first hanging portion 154 of the auxiliary operating lever 148 and the left-hand side face of the second hanging portion 160, as shown in FIG. 3. Further, the loci of the upward movement of the right-hand side face of the upper end portion of the second operating lever 16 and the left-hand side face of the second engaging portion 40 are located between the right-hand side face of the second engaged portion 162 of the second hanging portion 160 of the auxiliary operating lever 148 and the left-hand side face of the stopper 166, as shown in FIG. 3. Therefore, when the fourth operating lever 20 is located in its second position, the first or second operating lever 14 or 16 can be moved upward from its first position against the urging force of the urging means 28 or 38.

When the first operating lever 14 is moved upward from its first position against the urging force of the urging means 28 to locate the first engaging portion 30 of the first operating lever 14 above the first engaged portion 156 of the first hanging portion 154 of the auxiliary operating lever 148, the first electric signal produced from the first signal generator SG1 causes the output shaft of the motor 80 to rotate in one direction at relatively high speed, thereby rotating the capstan 72 and the first gear 74 in the direction indicated by arrow A in FIG. 3 at relatively high speed. When the first operating lever 14 is moved upward from its first position against the urging force of the urging means 28, the pinch roller is separated from the magnetic recording tape 194 in the tape cassette 8. Then, the tape 194 is released from the joint hold by the pinch roller and the capstan 72.

The relatively fast rotation of the first gear 74 in the direction indicated by arrow A is transmitted through the second gear 86 to the third gear 90. Then, the third gear 90 rotates in the direction indicated by arrow B in FIG. 3 at relatively high speed, so that the magnetic recording tape 194 in the tape cassette 8 is quickly fed from the second reel hub 192 to the first reel hub 190. Thus, a fast-forward mode is established in the tape recorder 6 which is provided with the operating lever apparatus 4 including the plate rocking-coupling apparatus according to this embodiment. This means that the first operating lever 14 serves as a fast-forward lever in the tape recorder 6.

While the magnetic recording tape 194 is quickly fed from the second reel hub 192 to the first reel hub 190 in the aforesaid manner, the magnetic head 62 functioning as the reproducing head is in contact with the tape 194, as shown in FIG. 3. It is therefore possible to set up playback mode in the state that the magnetic recording tape 194 travels at relatively high speed. If the upward pressing force on the first operating lever 14 is removed, then the first operating lever 14 is moved downward by the urging force of the urging means 28 to be located in its first position.

Figure 4:
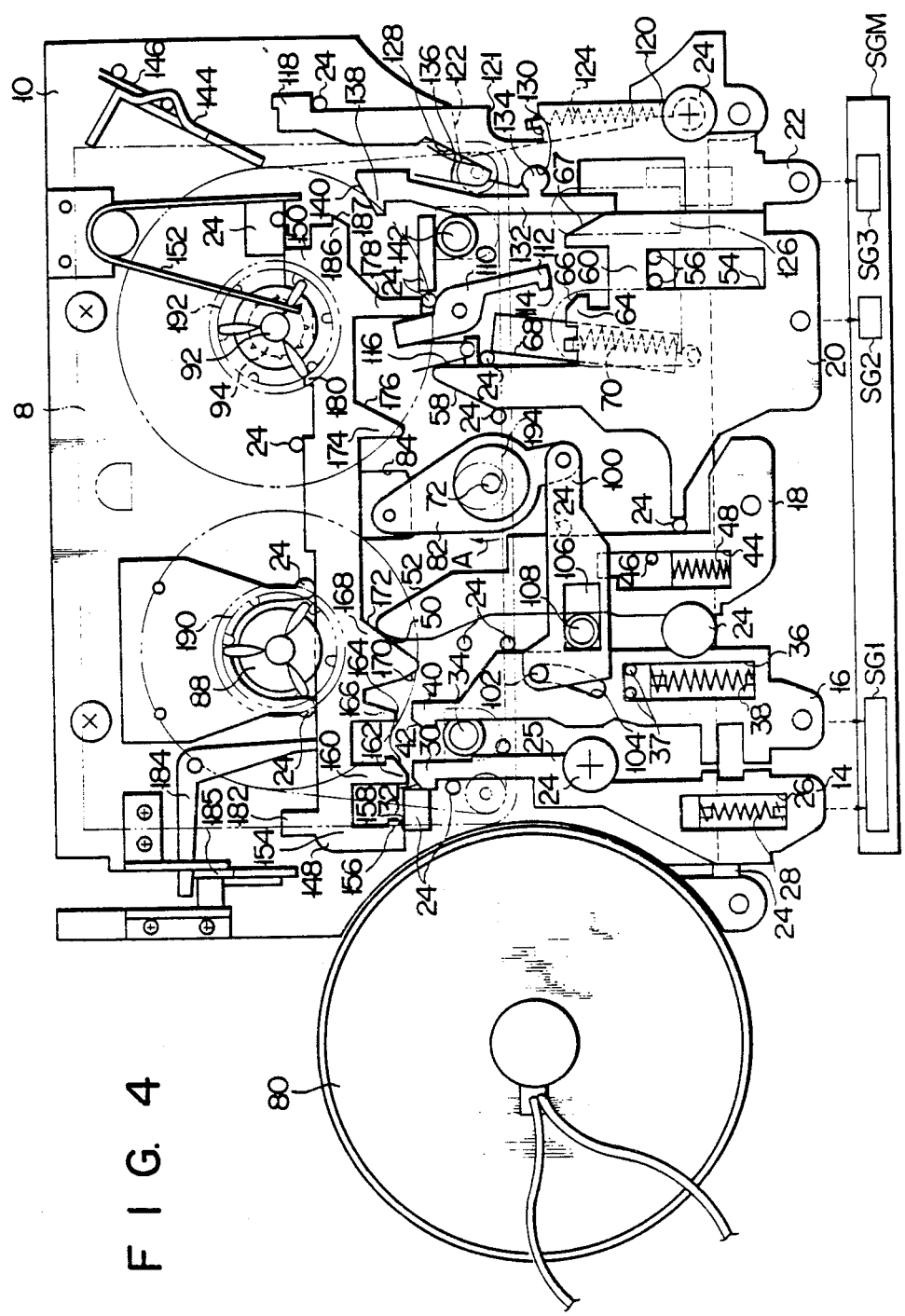
FIG. 4 is a plan view showing a state in which the pair of reel hubs of the tape cassette are mounted on the pair of reel shafts of the tape recorder of FIG. 2, and in which a third operating lever to function as a stop lever is located in its second position.

When the auxiliary operating lever 148 is in its second position, the third auxiliary slant face 172 of the third hanging portion 168 vertically faces the third slant face 50 of the third operating lever 18. Therefore, if the third operating lever 18 is moved upward from its first position against the urging force of the urging means 18, the third slant face 50 of the third operating lever 18 comes into slide contact with the third auxiliary slant face 172 of the third hanging portion 168, thereby causing the auxiliary operating lever 148 to move from its second position to the left against the urging force of the urging means 152, as shown in FIG. 4. Then, the left-hand side face of the first hook member 178 of the auxiliary operating lever 148 abuts on the right-hand side face of the upper end portion of the second rotating lever 110, as shown in FIG. 4, to cause the second rotating lever 110 to rotate counterclockwise against the urging force of the urging means 116. Thereupon, the third operating lever 18 stops moving upwardly. The position of the third operating lever 18 in this state is defined as its second position. Also, the position of the auxiliary operating lever 148 in this state is defined as its third position.

When the second rotating lever 110 rotates counterclockwise, the engaging projection 112 of the second rotating lever 110 is disengaged from the fourth engaging portion 64 of the fourth operating lever 20, as shown in FIG. 4. Then, the fourth operating lever 20 is moved downwardly by the urging force of the urging means 70 to be located in its first position. When the fourth operating lever 20 is located in its first position, the second signal generator SG2 ceases to produce the second electric signal, thus stopping the rotation of the output shaft of the motor 80 and disabling the magnetic head 62, which is off the magnetic recording tape 194 in the tape cassette 8, as shown in FIG. 4, from functioning as the reproducing head. Thus, stop mode is established in the tape recorder 6 which is provided with the operating lever apparatus 4 including the plate rocking-coupling apparatus according to this embodiment. This means that the third operating lever 18 serves as a stop lever in the tape recorder 6.

If the upward force having been so far applied to the third operating lever 18 against the urging force of the urging means 48 is removed, the third operating lever 18 is moved downward by the urging force of the urging means 48 to be located in its first position. As the third operating lever 18 moves from its second position to the first position, the auxiliary operating lever 148 is moved to the right by the urging force of the urging means 152 and is returned to its first position.

Accordingly, the rotation of the second reel shaft 92 is stopped suddenly by the engaging member 180 of the auxiliary operating lever 148. At this time, the first reel shaft 88 continues on rotating by the agency of inertia, so that back tension acts on the magnetic recording tape 194 between the first and second reel hubs 190 and 192, and thereafter the first reel shaft 88 ceases to rotate.

Figure 5:
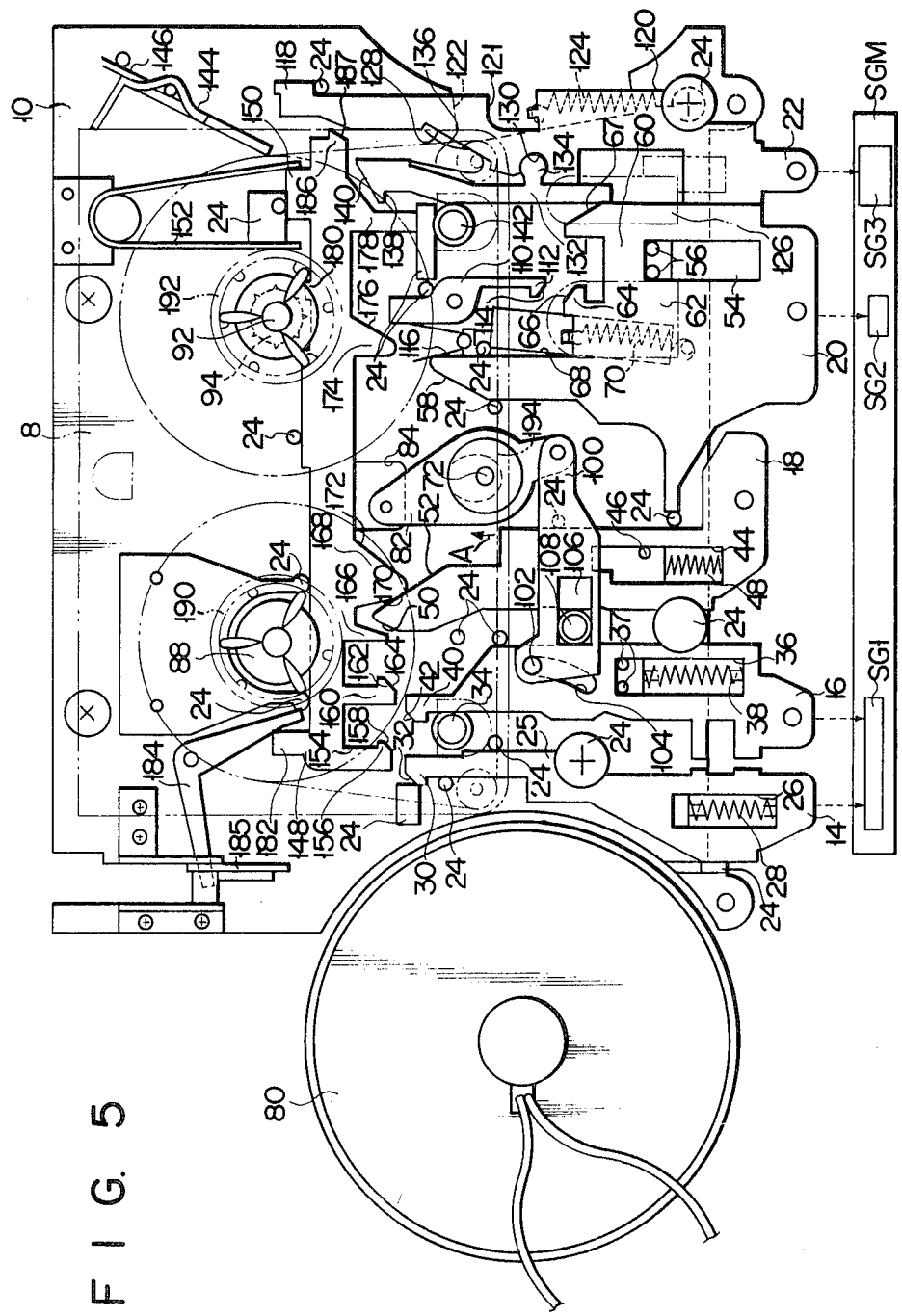
FIG. 5 is a plan view showing a state in which the pair of reel hubs of the tape cassette are mounted on the pair of reel shafts of the tape recorder of FIG. 2, and in which the third operating lever is located in its second position to function as an ejecting lever.

If the third operating lever 18 is pushed up again when the auxiliary operating lever 148 is located in its first position, the third slant face 52 of the third operating lever 18 comes into slide contact with the third auxiliary slant face 170 of the third hanging portion 168 of the auxiliary operating lever 148, thereby causing the auxiliary operating lever 148 to move to the right from its first position against the urging force of the urging means 152, as shown in FIG. 5. Then, the second hook member 182 causes the third rotating lever 184 to rotate in the counterclockwise direction, and the third rotating lever 184 causes the ejecting lever 185 to rotate in the forward direction to cross the first base plate 10. The ejecting lever 185 causes a member (not shown) facing the bottom of the housing of the tape cassette 8 to move in the forward direction of FIG. 5, thereby moving the tape cassette 8 in the forward direction. Thus, the first and second reel hubs 190 and 192 of the tape cassette 8 are disengaged from the first and second reel shafts 88 and 92, respectively, of the tape recorder 6. That is to say, an ejecting mode is established in the tape recorder 6. This means that the third operating lever 18 further serves as an ejecting lever.

If the upward force on the third operating lever 18 is removed, the third operating lever 18 is moved downward by the urging force of the urging means 48 to be located in its first position. As the third operating lever 18 moves from its second position to the first, the auxiliary operating lever 148 is moved to the left by the urging force of the urging means 152, and is returned to its first position.

Then, the fourth operating lever 20 is located in its second position, as shown in FIG. 3. In this state, the fifth auxiliary slant face 187 of the auxiliary operating lever 148 in its second position vertically faces the fifth slant face 140 of the rocking lever 132, as shown in FIG. 3. If the fifth operating lever 22 is pressed upward, moreover, it moves up from its first position against the urging force of the urging means 124. Since the left-hand side face of the rocking lever 132 of the upwardly moving fifth operating lever 22 is in slide contact with the right-hand side face of the support portion 60 of the fourth operating lever 20, the rocking lever 132 is kept from rocking around the projected portion 134, and the fifth slant face 140 is brought into slide contact with the fifth auxiliary slant face 187 of the auxiliary operating lever 148. Thereupon, the auxiliary operating lever 148 moves from its second position shown in FIG. 3 to the left against the urging force of the urging means 152. Before the auxiliary operating lever 148 is located in its third position shown in FIG. 4, the fifth engaged portion 186 of the auxiliary operating lever 148 and the fifth engaging portion 138 of the rocking lever 132 of the fifth operating lever 22 engage each other. Then, the fifth operating lever 22 stops its upward movement. The position of the fifth operating lever 22 in this state is defined as its second position. Further, the position of the auxiliary operating lever 148 in this state is defined as its fourth position. When the auxiliary operating lever 148 is in its fourth position, the engaging member 180 of the auxiliary operating lever 148 is off the locus of rotation of the projections on the projected member 94 of the second reel shaft 92, as shown in FIG. 6.

Figure 6:
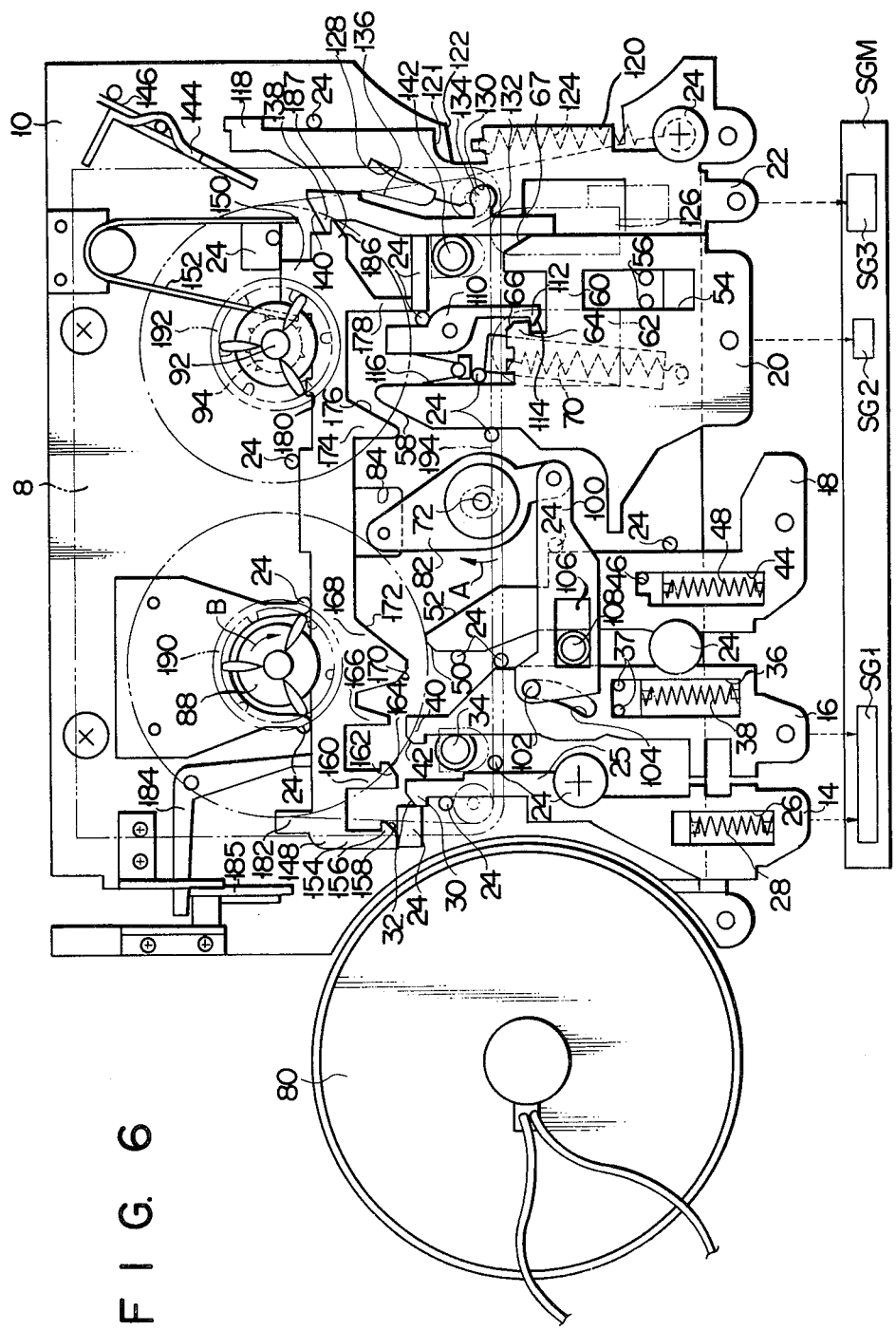
FIG. 6 is a plan view showing a state in which the pair of reel hubs of the tape cassette are mounted on the pair of reel shafts of the tape recorder of FIG. 2, and in which the fourth operating lever to function as the playback lever and a fifth operating lever to function as a recording lever and constitute a first plate member of the invention are located in their respective second positions.

When the fifth operating lever 22 is located in its second position, the erasing head 126 comes into contact with the surface of the magnetic recording tape 194, as shown in FIG. 6. As mentioned before, the fifth operating lever 22 is pressed against the front surface of the first base plate 10 and the guide projection 24 by the urging force of the urging means 124. Accordingly, a predetermined portion of the erasing head 126 alway abuts on the surface of the tape 194.

When the fifth operating lever 22 is located in its second position, the third signal generator SG3 causes the magnetic head 62 to function as the recording head. In this state, therefore, information collected by means of a microphone (not shown) attached to the tape recorder 6 is recorded on the magnetic recording tape 194 by the magnetic head 62 as the tape 194 runs from the second reel hub 192 to the first reel hub 190 at the fixed speed. Thus, a recording mode is established in the tape recorder 6 which is provided with the operating lever apparatus 4 including the plate rocking-coupling apparatus according to this embodiment. This means that the fifth operating lever 22 serves as a recording lever in the tape recorder 6.

When the auxiliary operating lever 148 is in its fourth position, the upper end face of the first operating lever 14 vertically faces the lower end face of the second hanging portion 160 of the auxiliary operating lever 148, as shown in FIG. 6. At the same time, the upper end face of the second operating lever 16 vertically faces the lower end face of the stopper 166 of the auxiliary operating lever 148, as shown in FIG. 6. Accordingly, if the first or second operating lever 14 or 16 is pressed upward when the tape recorder 6 is in the recording mode, then the upper end face of the first or second operating lever 14 or 16 will abut on the lower end face of the second hanging portion 160 or the stopper 166 of the auxiliary operating lever 148. It is therefore impossible to locate the first or second operating lever 14 or 16 in its second position. Thus, the fast-forward or fast rewinding mode cannot be established while the tape recorder 6 is in the recording mode.

The fourth and fifth operating levers 20 and 22 in their respective second positions are returned to their respective first positions by the urging forces of the urging means 70 and 124, respectively, by locating the third operating lever 18 to its second position to bring the auxiliary operating lever 148 to its third position, thereby disengaging the engaging projection 112 of the second rotating lever 110 and the fifth engaged portion 186 of the auxiliary operating lever 148 from the fourth engaging portion 64 of the fourth operating lever 20 and the fifth engaging portion 138 of the rocking lever 132 of the fifth operating lever 22, respectively.

Figure 7:
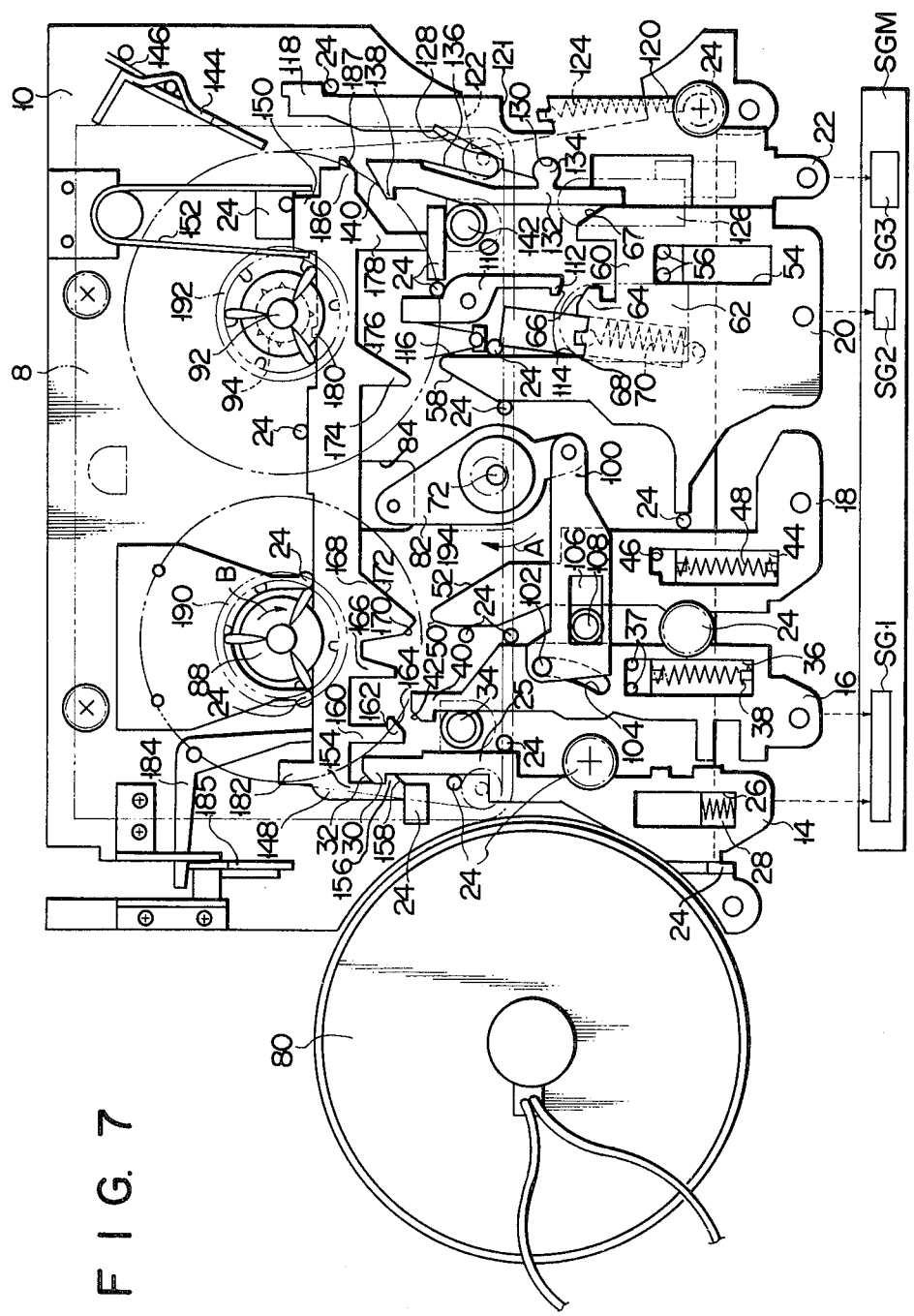
FIG. 7 is a plan view showing a state in which the pair of reel hubs of the tape cassette are mounted on the pair of reel shafts of the tape recorder of FIG. 2, and in which a first operating lever to function as a fast-forward lever is located in its second position.

If the first operating lever 14 is pressed upward against the urging force of the urging means 28 when the first to fifth operating levers 14, 16, 18, 20 and 22 are in their respective first positions, as shown in FIG. 2, then the first slant face 32 of the first operating lever 14 comes into slide contact with the first auxiliary slant face 158 of the auxiliary operating lever 148 to cause the auxiliary operating lever 148 to move from its first position to the left against the urging force of the urging means 152. Before the auxiliary operating lever 148 reaches its third position, the first engaging portion 30 of the first operating lever 14 engages the first engaged portion 156 of the auxiliary operating lever 148, as shown in FIG. 7. Thereupon, the first operating lever 14 stops its upward movement. The position of the first operating lever 14 in this state corresponds to its first position. Thus, the fast-forward mode is established in the tape recorder 6. The position of the auxiliary operating lever 148 is defined as its fifth position. When the auxiliary operating lever 148 is located in its fifth position, the engaging member 180 of the auxiliary operating lever 148 gets out of the locus of rotation of the projections on the projected member 94 of the second reel shaft 92, as shown in FIG. 7. The second auxiliary slant face 164 of the auxiliary operating lever 148 in the fifth position vertically faces the second slant face 42 of the second operating lever 16.

Figure 8:
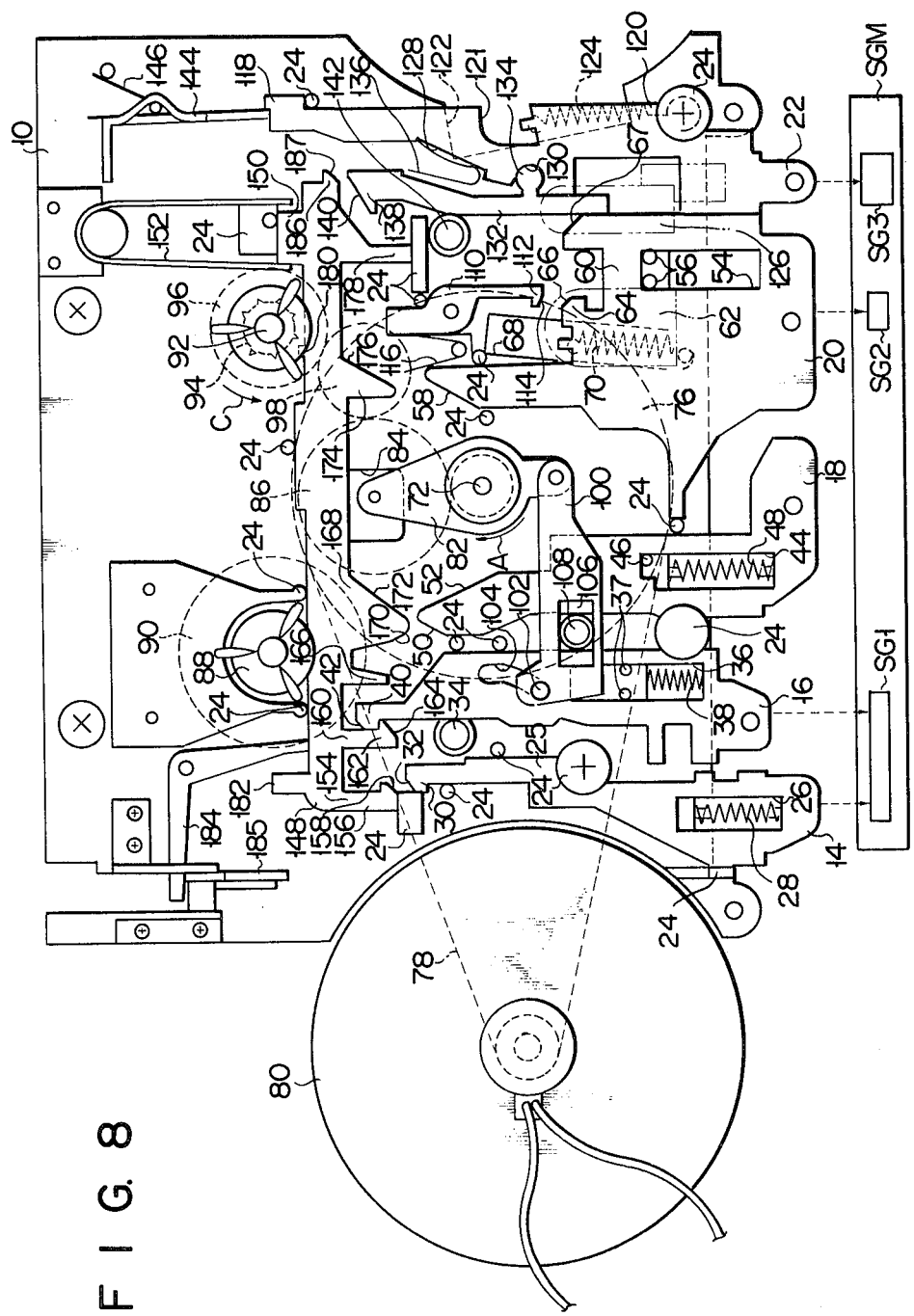
FIG. 8 is a plan view showing a state in which a second operating lever to function as a fast rewinding lever of the tape recorder of FIG. 2 is located in its second position.

If the second operating lever 16 is pressed upward against the urging force of the urging means 38 when the first operating lever 14 is in its second position, the second slant face 42 of the second operating lever 16 comes into slide contact with the second auxiliary slant face 164 of the second hanging portion 160 of the auxiliary operating lever 148 in its fifth position, thus causing the auxiliary operating lever 148 to move from its fifth position to the left against the urging force of the urging means 152. When the left-hand side face of the second engaging portion 40 of the second operating lever 16 comes into contact with the right-hand side face of the second engaged portion of the second hanging portion 160 of the auxiliary operating lever 148, the first engaging portion 30 of the first operating lever 14 is disengaged from the first engaged portion 156 of the first hanging portion 154 of the auxiliary operating lever 148, and the first operating lever 14 is returned to its first position by the urging force of the urging means 28. Thereafter, if the second operating lever 16 is further moved upward, the second engaging portion 40 of the second operating lever 16 engages the second engaged portion 162 of the second hanging portion 160 of the auxiliary operating lever 148, as shown in FIG. 8. Thereupon, the second operating lever 16 stops its upward movement. The position of the second operating lever 16 in this state is defined as its second position. The position of the auxiliary operating lever 148 in this state corresponds to its fifth position. The first auxiliary slant face 158 of the first hanging portion 154 of the auxiliary operating lever 148 in the fifth position vertically faces the first slant face 32 of the first operating lever 14 in its first position.

As the second operating lever 16 moves from its first position to the second, the coupling member 100, which has its guide pin 102 guided by the guide hole 104 of the second operating lever 16, moves from the position shown in FIG. 2 to the left. As the coupling member 100 moves to the left, the first rotating lever 82 rotates clockwise from its first position shown in FIG. 2. Thus rotated, the first rotating lever 82 keeps the second gear 86 apart from the third gear 90 of the first reel shaft 88. When the coupling member 100 stops its leftward movement, that is, when the second operating lever 16 is located in its second position, the second gear 86 of the first rotating lever 82 comes to be in mesh with the fifth gear 98, as shown in FIG. 8. The position of the first rotating lever 82 in this state is defined as its second position.

When the second operating lever 16 is located in its second position, the first signal generator SG1 generates the first electric signal and the output shaft of the motor 80 rotates in one direction at relatively high speed, causing the capstan 72 and the first gear 74 to rotate in the direction indicated by arrow A in FIG. 3 at relatively high speed. When the second operating lever 16 is moved upward from its first position against the urging force of the urging means 38, the pinch roller is removed from the magnetic recording tape 194 in the tape cassette 8. Thus, the tape 194 is released from the joint hold by the pinch roller and the capstan 72. For the ease of visual illustration of the operation of the first to fifth gears 74, 86, 90, 96 and 98, the magnetic recording tape 194 in the tape cassette 8 and the second base plate 12 are omitted in FIG. 8. The relatively fast rotation of the first gear 74 in the direction indicated by arrow A is transmitted through the second gear 86 to the fourth gear 98. Then, the fifth gear 96 rotates in the direction indicated by arrow C in FIG. 8 at relatively high speed, so that the magnetic recording tape 194 in the tape cassette 8 is quickly rewound from the first reel hub 190 fitted on the first reel shaft 88 to the second reel hub 192 fitted on the second reel shaft 92. Thus, a fast rewinding mode is established in the tape recorder 6 which is provided with the operating lever apparatus 4 including the plate rocking-coupling apparatus according to this invention. This means that the second operating lever 16 serves as a fast rewinding lever in the tape recorder 6.

If the auxiliary operating lever 148 is shifted from its fifth position shown in FIG. 8 to its third position by locating the third operating lever 18 in its second position, the second engaging portion 40 of the second operating lever 16 is disengaged from the second engaged portion 162 of the second hanging portion 160 of the auxiliary operating lever 148, and the second operating lever 16 is returned to its first position by the urging force of the urging means 38. Thereupon, the coupling member 100, having its guide pin 102 guided by the guide hole 104 of the second operating lever 16, moves to the right to locate the first rotating lever 82 in its first position, as shown in FIG. 2.

Figure 9:
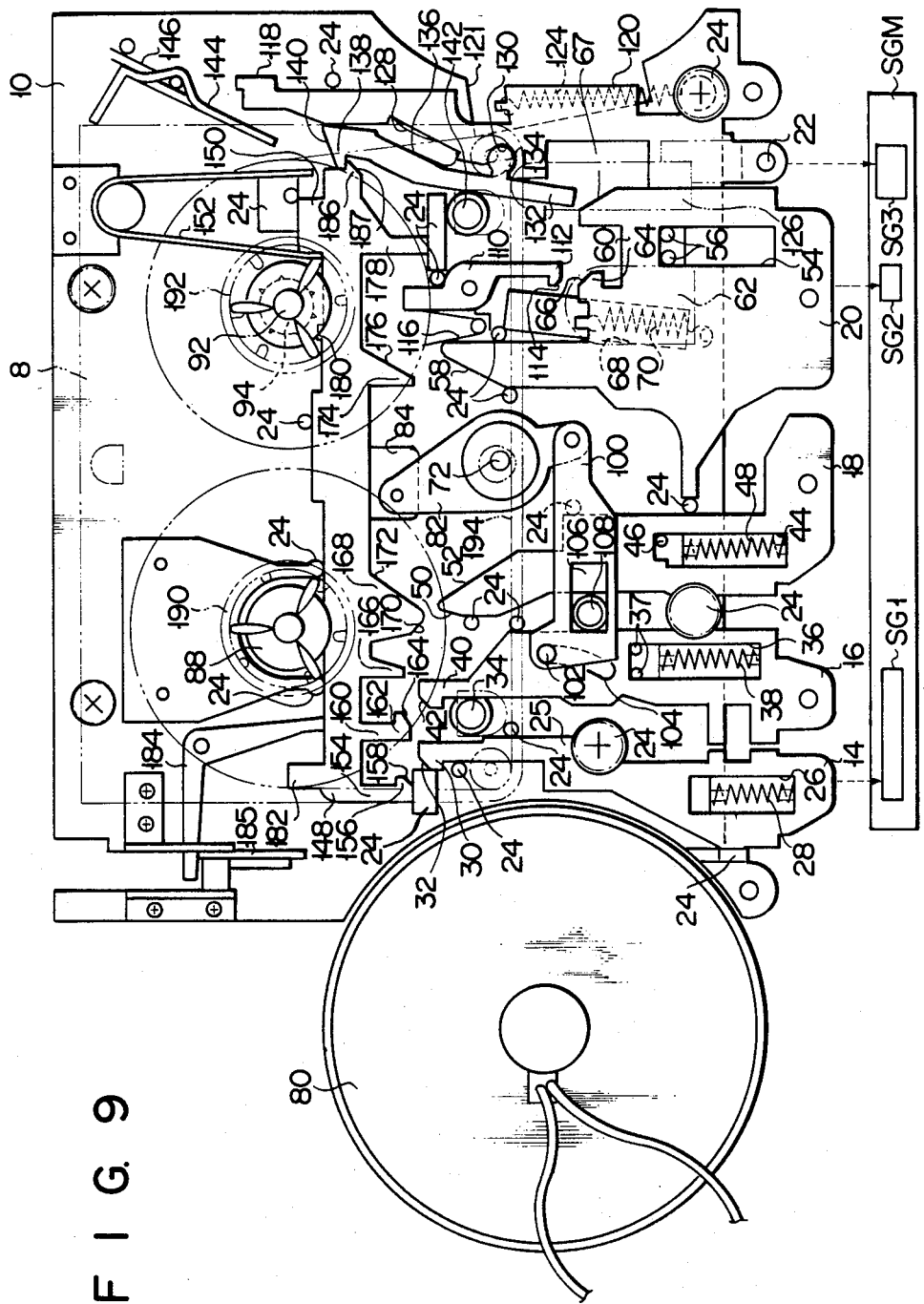
FIG. 9 is a plan view showing a state in which the pair of reel hubs of the tape cassette are mounted on the pair of reel shafts of the tape recorder of FIG. 2, and in which the fifth operating lever to function as the recording lever and constitute the first plate member of the invention is located in its second position, and a rocking lever to constitute a second plate member of the invention is turned around its projected portion.

When the first to fifth operating levers 14, 16, 18, 20 and 22 are in their respective first positions, as shown in FIG. 2, the fifth operating lever 22 is moved upward from its first position against the urging force of the urging means 124. The rocking lever 132 of the upwardly moving fifth operating lever 22 brings its fifth slant face 140 into slide contact with the fifth auxiliary slant face 187 of the auxiliary operating lever 148, and the lower end of its left-hand side face into slide contact with the chamfer portion 67 of the support portion 60 of the fourth operating lever 20. Thus, the rocking member 132 rotates clockwise around the projected portion 134 against the urging force of the urging means 136, that is, moves in the direction in which the auxiliary operating lever 148 moves from its second position to the first position. Before the slide contact between the fifth slant face 140 of the rocking lever 132 and the fifth auxiliary slant face 187 of the auxiliary operating lever 148 terminates, the upper end of the right-hand side face of the rocking lever 132 abuts on the left-hand side face of the fifth operating lever 22 to stop the rotation of the rocking lever 132. The position of the rocking lever 132 in this state corresponds to its second position. The stopped rocking lever 132 is further moved upward by the fifth operating lever 22 to bring its fifth slant face 140 into slide contact with the fifth auxiliary slant face 187, thereby causing the auxiliary operating lever 148 to move from its first position to the left against the urging force of the urging means 152. When the fifth engaging member 138 engages the fifth engaged member 186, as shown in FIG. 9, the fifth operating lever 22 stops its upward movement. The position of the fifth operating lever 22 in this state corresponds to its second position, and the position of the auxiliary operating lever 148 in this state corresponds to its fifth position. Thus, the erasing head 126 is in contact with the surface of the magnetic recording tape 194 in the tape cassette 8.

Figure 10:
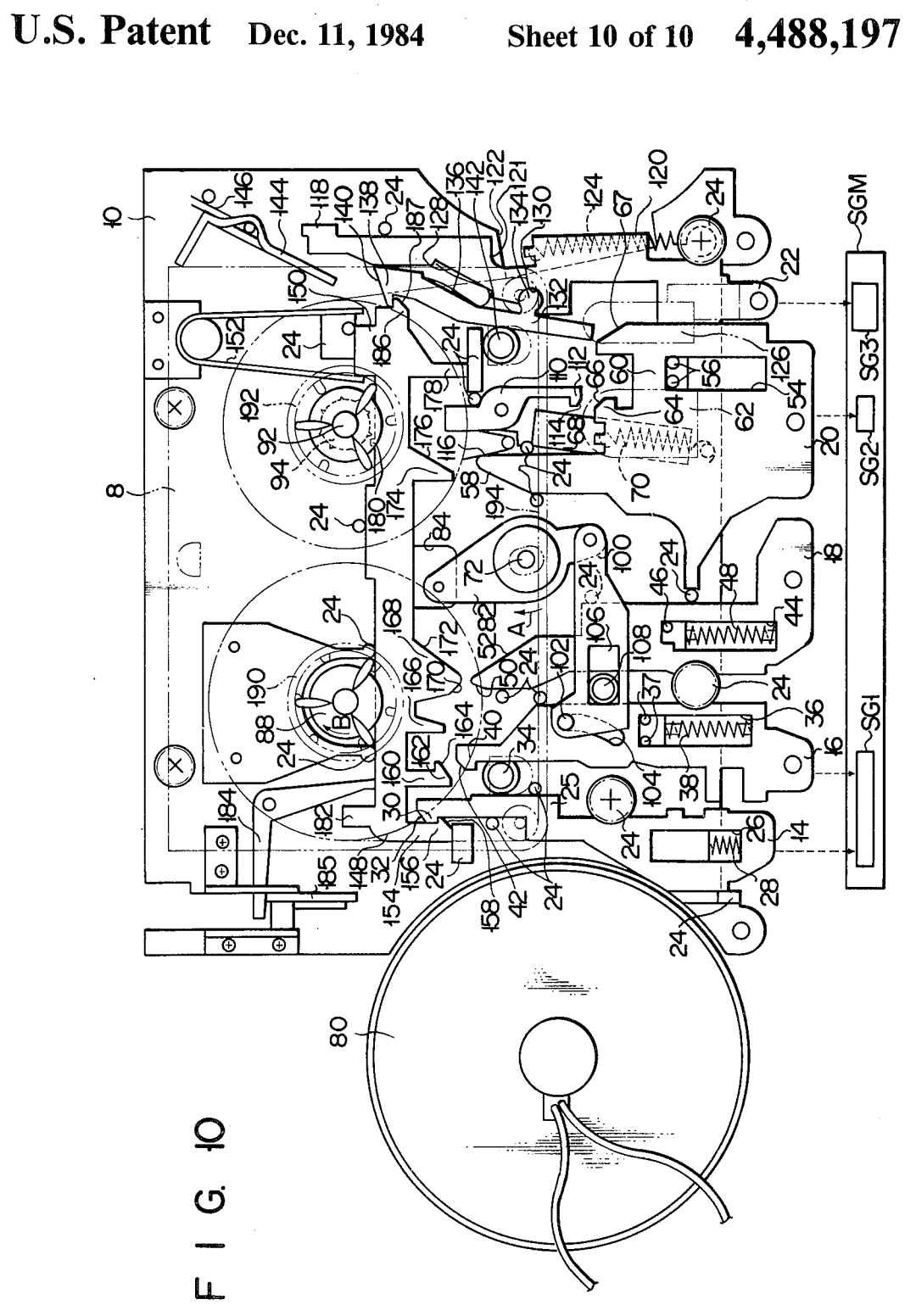

Subsequently, the first or second operating lever 14 or 16 is located in its second position, as shown in FIG. 10. Immediately before such positioning of the first or second operating lever 14 or 16, the first or second slant face 32 or 42 comes into slide contact with the first or second auxiliary slant face 158 or 164 to cause the auxiliary operating lever 148 to move from its fifth position to the left against the urging force of the urging means 152. At this time, however, the rocking lever 132 is rotated clockwise around the projected portion 134 by the urging force of the urging means 136. In other words, the rocking lever 132 follows the movement of the auxiliary operating lever 148. Therefore, when the first or second operating lever 14 or 16 is located in its second position, the fifth engaging portion 138 of the rocking lever 132 is kept engaged with the fifth engaged portion 186 of the auxiliary operating lever 148, as shown in FIG. 10. Then, the erasing head 126 erases information previously recorded on the magnetic recording tape 194 as the tape 194 runs from the second reel hub 192 of the first reel hub 190 or contrariwise. This means that the fifth operating lever 22 further serves as an erasing lever in the tape recorder 6.

The first or second operating lever 14 or 16 in its second position can be returned to its first position by locating the third operating lever 18 in its second position to bring the auxiliary operating lever 148 to its third position. When the auxiliary operating lever 148 is in its third position, the fifth engaged portion 186 is located on the left of the fifth engaging portion 138 of the rocking lever 132 in its first position. Accordingly, the fifth engaged portion 186 is disengaged from the fifth engaging portion 138 to allow the fifth operating lever 22 to be returned to its first position by the urging force of the urging means 136.

Although an illustrative embodiment of this invention has been described in detail herein, it is to be understood that the invention is not limited to the embodiment, and that various changes and modifications may be effected therein by one skilled in the art without departing from the scope or spirit of the invention.

For example, the outer peripheral surface of the projected portion 134 of the rocking lever 132, which constitutes the second plate member, may be formed in the shape of a polygon so that the several vertices of the polygon may describe one and the same circular locus.

I claim:
1. A plate rocking-coupling apparatus comprising:
   a first plate member extending in a longitudinal direction and having a peripheral surface, the peripheral surface of the first plate member having formed therein an indentation with an opening, said indentation having a peripheral surface interior of the peripheral surface of said first plate member, the length of said opening along the longitudinal direction of said peripheral surface being shorter than the length of said indentation along said longitudinal direction at a position spaced from said opening toward the interior of said first plate member; and
a second plate member having a peripheral surface and a projecting portion protruding from the peripheral surface of the second plate member, said projecting portion being engaged in said opening so as to be in slide contact with said peripheral surface of said indentation along the circumferential direction of said peripheral surface of said indentation, whereby said first and second plate members are rockable relative to each other due to said slide contract.

2. A plate rocking-coupling apparatus according to claim 1, wherein the respective plane configurations of said indentation and said projected portion in slide contact with the peripheral surface of said indentation are circular.

3. A plate rocking-coupling apparatus according to claim 1, wherein said projecting portion of said second plate member is longer in the longitudinal direction of said peripheral surface of said first plate member than the length of said indentation along said same longitudinal direction as said position spaced from said opening, whereby said projecting portion is positively retained in said indentation.

4. A plate rocking-coupling apparatus according to claim 3, wherein said projecting portion comprises a first portion in slide engagement with said indentation, and a second portion which is passable through said opening of said first plate member.

5. A plate rocking-coupling apparatus according to claim 1, wehrein said projecting portion comprises a first portion in slide engagement with said indentation, and a second portion which is passable through said opening of said first plate member.

6. A plate rocking-coupling apparatus according to claim 1, wherein said first and second plate members are in substantially the same plane.

7. A plate rocking-coupling apparatus according to claim 6, wherein said first and second plate members have substantially the same thickness.

8. A plate rocking-coupling apparatus according to claim 1, wherein said first and second plate members have substantially the same thickness.

* * * * *